(12) United States Patent  
Mukogawa

(10) Patent No.: US 7,043,639 B2
(45) Date of Patent: May 9, 2006

(54) INFORMATION PROCESSING APPARATUS AND INPUT OPERATION APPARATUS

(75) Inventor: Satoshi Mukogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 842 days.

(21) Appl. No.: 10/020,434

(22) Filed: Dec. 18, 2001

(65) Prior Publication Data

US 2003/0044013 A1 Mar. 6, 2003

(30) Foreign Application Priority Data

Aug. 24, 2001 (JP) ............................. 2001-254509

(51) Int. Cl.
*G06F 1/24* (2006.01)
(52) U.S. Cl. .................. 713/182; 713/184; 713/200; 713/201
(58) Field of Classification Search ................ 713/182, 713/184, 200, 201
See application file for complete search history.

(56) References Cited

U.S. PATENT DOCUMENTS

| 5,584,023 A | * | 12/1996 | Hsu ............................. 707/204 |
| 5,768,386 A | | 6/1998 | Yokomoto et al. |
| 5,778,068 A | | 7/1998 | Johnson et al. |
| 5,787,172 A | * | 7/1998 | Arnold ......................... 713/175 |
| 5,892,826 A | * | 4/1999 | Brown et al. ................ 713/190 |
| 6,148,400 A | * | 11/2000 | Arnold ......................... 713/168 |
| 2001/0008012 A1 | | 7/2001 | Kausik |

FOREIGN PATENT DOCUMENTS

| EP | 0 947 908 A2 | 3/1999 |
| EP | 1 014 618 A1 | 6/2000 |
| EP | 1 035 543 A2 | 9/2000 |
| EP | 1 069 567 A1 | 1/2001 |
| JP | 8-331394 | 12/1996 |
| JP | 10-177550 | 6/1998 |
| JP | 11-85842 | 3/1999 |
| JP | 11-215122 | 8/1999 |
| JP | 2000-132543 | 5/2000 |
| JP | 2000-315998 | 11/2000 |
| WO | WO 00/39951 | 7/2000 |
| WO | WO 01/39099 | 5/2001 |

OTHER PUBLICATIONS

Notification of the First Office Action (Office Action from Chinese Patent Office).
Communication including European Search Report from the European Patent Office dated Aug. 19, 2004 for the corresponding European Patent Application.
Communication including Partial European Search Report from the European Patent Office dated May 14, 2004 for the corresponding European Patent Application.

* cited by examiner

*Primary Examiner*—Thomas R. Peeso
(74) *Attorney, Agent, or Firm*—Staas & Halsey LLP

(57) ABSTRACT

Leakage of personal information in an apparatus is prevented to protect security thereof. The apparatus 10 includes an input operation section 20 by which an operator can carries out a predetermined input operation, and a control section 30 for performing prescribed control on the input operation section 20. The input operation section 20 serves to perform data transmission to an external device 50 which is provided outside the apparatus 10. The input operation section 20 is characterized in that it is provided with a cipher module 24 for encrypting prescribed data which is input through the input operation section 20, and a transmission section 26 for transmitting data encrypted by the cipher module 24 to the external device 50.

21 Claims, 10 Drawing Sheets

Fig. 5

| coordinate range | | related data |
|---|---|---|
| X coordinate | Y coordinate | |
| (10~20) | (20~40) | 1 |
| (20~30) | (20~40) | 2 |
| (30~40) | (20~40) | 3 |
| (10~20) | (40~60) | 4 |
| (20~30) | (40~60) | 5 |
| (30~40) | (40~60) | 6 |
| (10~20) | (60~80) | 7 |
| (20~30) | (60~80) | 8 |
| (30~40) | (60~80) | 9 |
| (20~30) | (80~100) | 0 |

Fig.7 (a) screen display example please input membership identification number

***-***

| 0 | 1 | 2 | 3 | 4 | 5 | 6 | 7 | 8 | 9 | 0 |
| A | B | C | D | E | F |

Fig.7 (b) pattern 1

| 0 | 1 | 2 | 3 | 4 | 5 | 6 | 7 | 8 | 9 |
| A | B | C | D | E | F |

Fig.7 (c) pattern 2

| 1 | 2 | 3 |
| 4 | 5 | 6 |
| 7 | 8 | 9 |
| | | 0 |

Fig.7 (d) pattern 3

| 0 | 1 | 2 | 3 | 4 | 5 | 6 | 7 | 8 | 9 |

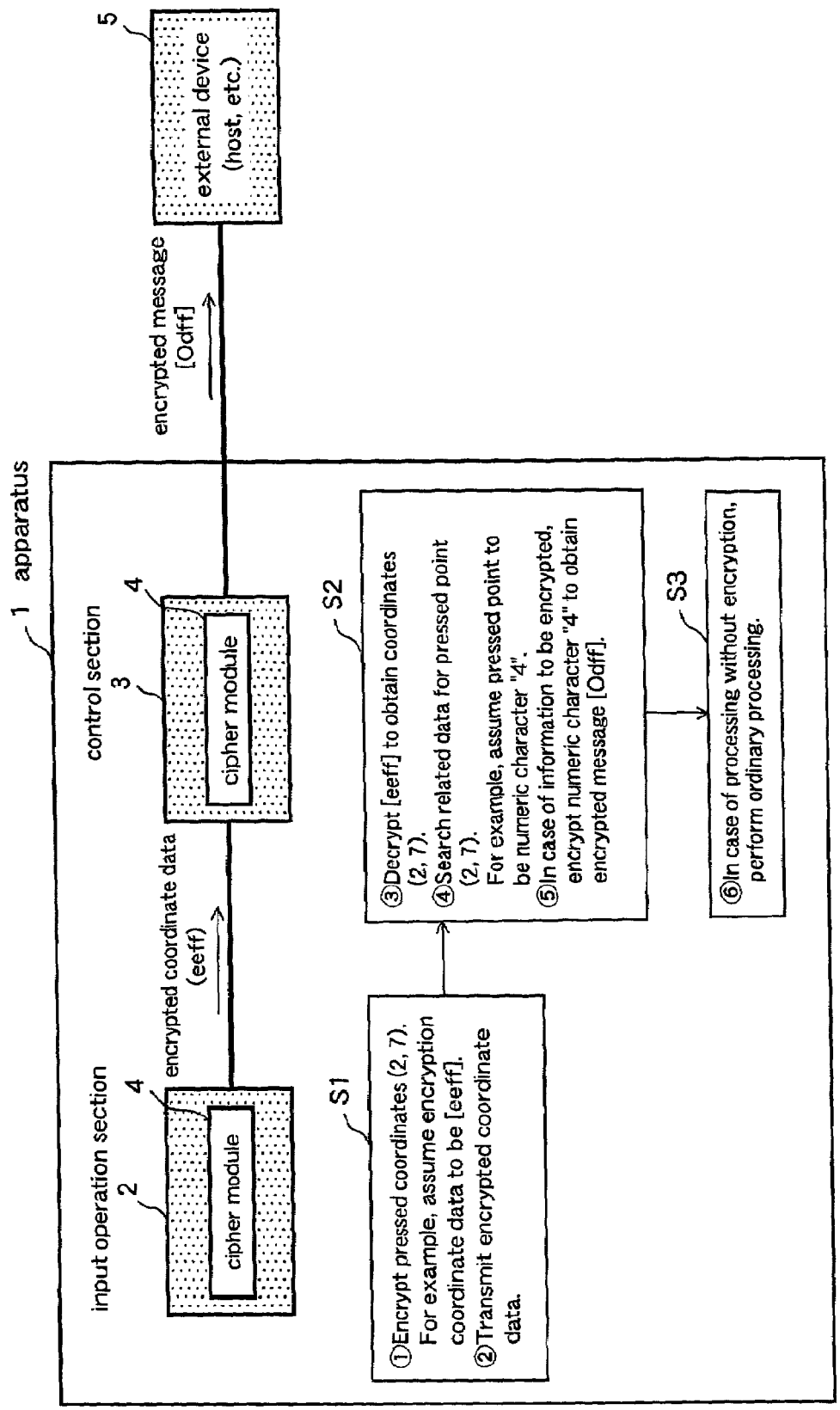

INFORMATION PROCESSING APPARATUS AND INPUT OPERATION APPARATUS

BACKGROUND OF THE INVENTION

1. Field of the Invention

The present invention relates to an apparatus having an input operation section and a control section, and more specifically, it relates to such an apparatus having high security which is used as a terminal or the like through which an input operation is performed, for example in a banking terminal, a variety of kinds of ticket vending machines, etc.

2. Description of the Related Art

In banking terminals, various kinds of ticket vending machines, etc., there is used an apparatus in which a button or a pointer displayed on a screen such as a touch panel is operated by a user or operator who actually touches the screen, and in some cases, operator's personal secret information such as a personal identification number, a credit card identification number, etc., is input through the apparatus. In addition, such an apparatus includes an input operation section and a device control section which are not usually integrated with each other, but connected with each other through a cable or the like.

FIG. 9 is a block diagram illustrating a part of such an apparatus or a part of a known system including such an apparatus whose security has been considered to be assured. This figure shows a system comprising an apparatus 1 and an external device or equipment 5 which is connected with the apparatus 1 through a dedicated line or a common carrier leased line 7, the apparatus 1 including an input operation section 2, a device control section 3 and another internal device 6, and a shaded part in this figure indicates the portion whose security has been considered to be assured. Thus, the transmission of data from the input operation section 2 to the control section 3 as well as the transmission of data from the control section 3 to the internal device 6 is performed in plain texts. Also, data transmission between the control section 3 and the external equipment 5 is performed through the common carrier leased line 7 in plain text data.

However, in recent years, tapping equipment is also improving its performance, and there are cases in which malicious person might disguise as a maintenance worker or attendant for the apparatus 1 to do unauthorized or illegal conducts, so it could not be necessarily said that the above system keeps satisfactory security. Accordingly, there is an increasing danger that identity or personal information such as personal identification number or the like input from the touch panel, etc., of the apparatus 1 might be leaked. Therefore, to deal with such tapping and illegal conducts, it becomes necessary to improve the security in the apparatus. At present, banking terminals, various kinds of ticket vending machines and the like are set up or installed in various places, but there are many installation locations unattended for these terminals and machines. Moreover, there is a tendency that the operating time of such terminals and machines is extended to 24 hours or from morning to midnight, so high security is required so as to prevent the leakage of the identity or personal secret information from the apparatus.

As a technique for keeping the security of the apparatus, it have been proposed certain methods of preventing the above-mentioned secret information from being leaked by someone looking into the screen (furtive glance) or by an operation analysis as disclosed in Japanese Patent Application Laid-Open Nos. 9-54862 and 2000-20468, but in these methods, the position of operation on the screen and the keyboard layout are changed upon each operation, and hence the operator's accustomedness and convenience might be obstructed.

Moreover, as a simple method for ensuring security, it is considered to adopt, upon inputting by means of the touch panel or the like of the apparatus 1, a method of encrypting and transmitting the data of coordinates pressed by the touch panel without any other processing thereof as shown in FIG. 10. In this method, the coordinate data such as, for instance, (2, 7), input by the input operation section 2 is encrypted into "eeff" by a cipher module 4 of the input operation section 2, and the encrypted coordinate data "eeff" is then transmitted to the control section 3 (step S1). It is necessary for the control section 3, which has received the data thus transmitted, to decrypt the encrypted coordinate data so as to convert it into numerical or character data or instruction directive data according to a screen configuration. In this example, the received data is converted into a numeric character "4" in this case. Here, it is determined whether the numeric character "4" is the data which should be encrypted for transmission to the external equipment 5, and if it is determined to be the data needed to be encrypted, the numeric character "4" is encrypted into an encrypted message "0dff", which is then transmitted to the external equipment 5 (step S2). On the other hand, when it is determined that the numeric character "4" is the data which should not be encrypted, ordinary processing is carried out on the numeric character "4", that is, the numeric character "4" is processed in the control section 3 as it is, or the raw data which is not encrypted is transmitted to the external equipment 5 as it is (step S3).

However, in this method, the control section 3 analyzes the data, and hence it is essential to ensure security of the control section 3 and provide a tapping prevention mechanism (unauthorized conduct prevention device). In addition, since the control section 3 performs encryption and decryption, it is required that the control section 3 is provided with an encryption/decryption module (cipher module 4) separately from or in addition to the input operation section 2. Moreover, since ordinary control data which need not be encrypted is also subjected to encryption and sent out from the input operation section 2, there is a problem that the amount of processing is increased by processing of decryption, accordingly increasing the load on the apparatus 1.

SUMMARY OF THE INVENTION

The present invention has been made in consideration of the circumstances as referred to above, and has for its object to provide an information processing apparatus which is capable of transmitting information to another external device in a safe manner while ensuring the security of personal secret information inside the apparatus.

In order to obviate the above problems, according to a first aspect of the present invention, there is provided an information processing apparatus including an input operation section through which an input is entered by an operator and a control section for performing prescribed control on the input operation section, the input operation section comprising: an encryption determining section for discriminating data to be encrypted from data input through the input operation section; an encryption section for encrypting the data to be encrypted based on the result of determination of the encryption determining section; and a transmission section for transmitting both the encrypted data and non-encrypted data; wherein the control section performs processing based on the content of non-encrypted data received from said input operation section and at the same time sends encrypted data received from said input operation section to a device having a decryption function. Such an information processing apparatus is applied for instance to financial or banking system terminals, various kinds of ticket vending machines, etc. Incidentally, note that in such applications, the device having a decrypting function is equivalent to external equipment.

In a preferred form of the first aspect of the present invention, the input operation section has an input operation screen, and the encryption determining section determines whether the input data is to be encrypted, depending upon whether coordinates pressed on the input operation screen exist in a predetermined range or position. According to such a construction, if the input operation screen is a tough panel type screen for example, when the coordinate range or position on the screen pressed by an operator is in a numeric character area requiring security for example, the encryption section encrypts the data input by the operator, whereas when the coordinate range or position on the screen pressed by an operator is in an input area for "cancellation" or "verification" for which security is not required, the input data is not encrypted. In this manner, the data input by the user or operator can be dealt with or encrypted depending upon the situation, thus facilitating data processing.

In another preferred form of the first aspect of the present invention, the encryption section converts data, which is input in at least one of the predetermined coordinate range and the predetermined coordinate position on the input operation screen, into data information related to the coordinate range or position, and encrypts the data thus converted by using a predetermined key. Concretely, in cases where the input operation screen is a touch panel type screen for example as in the above case, when the coordinate range or position pressed by the operator corresponds to a numeric character area, the encryption section functions to convert the data input by the operator into a corresponding numeric character. In addition, when the converted numeric character requires security, it is subjected to encryption processing. Thus, it is possible to use various kinds of data input through the input operation section by converting them into suitable data information, and it is also possible to ensure security in a reliable manner by further encrypting the various input data.

In a further preferred form of the present invention, the information processing apparatus further comprises a setting section for dynamically receiving and setting information on a predetermined coordinate range or position on the input operation screen from an external device, wherein the encryption determining section determines whether the input data is to be encrypted, depending upon whether coordinates pressed on the input operation screen exist in the predetermined range or position set by the setting section. According to such a construction, in cases where the input operation screen is a touch panel type screen for example, information on the coordinate range or position such as the layout of the touch panel screen or the like can be received from the external device, so that the setting of the screen can be effected based on the data received, thus making it possible to display the touch panel in a variety of kinds of patterns. In addition, by making a determination of encryption according to such layout information, it is possible to efficiently perform the encryption processing according to various kinds of patterns.

In a preferred form of the first aspect of the present invention, the information processing apparatus further comprises a setting section for dynamically receiving and setting data setting information from the external device for converting data, which is input in at least one of the predetermined coordinate range and the predetermined coordinate position on the input operation screen, into data information related to the coordinate range or position. The encryption section converts data, which is input in at least one of the predetermined coordinate range and the predetermined coordinate position on the input operation screen, into data information related to the coordinate range or position based on the data setting information set by the setting section, and encrypts the data thus converted by using a predetermined key. Specifically, in a fourth embodiment of the present invention, the data setting information comprises coordinate information (FIG. 5) representative of the correlation between a coordinate range and related data codes. The encryption section (data processing section in this embodiment) converts and encrypts the data input from the touch panel into related data codes by using the coordinate information.

According to such a construction, various kinds of data can be allocated corresponding to the coordinate range or position of the input operation section, and hence in the case of an apparatus requiring security, it becomes possible to set the input operation screen in accordance with a variety of kinds of situations. In addition, the encryption processing is performed according to the setting, and hence the apparatus of the present invention is highly flexible and can provide excellent security as compared with the prior art.

According to a second aspect of the present invention, there is provided an input operation apparatus having an input operation screen for providing information, which is input by an operator through the input operation screen, to an information processing apparatus connected therewith, the input operation apparatus comprising: a setting section for setting data setting information for converting information on a predetermined coordinate range or position on the input operation screen as well as data, which is input in the predetermined coordinate range or position, into data information related to the coordinate range or position; an encryption determining section for determining whether the input data is to be encrypted, depending upon whether coordinates pressed on the input operation screen exist in the predetermined coordinate range or position set by the setting section; an encryption section for converting the input data, which is determined to be encrypted by the encryption determining section, into data information related to the coordinate range or position based on the data setting information set by the setting section, and encrypting the data thus converted by using a predetermined key; and a transmission section for transmitting both the encrypted data and non-encrypted data to the information processing apparatus connected therewith. By providing such an input operation apparatus in financial or banking systems, various kinds of ticket vending machines, etc., for which security is required, the security of these systems and machines can be strengthened, thereby preventing leakage of information.

According to a third aspect of the present invention, there is provided an information processing apparatus equipped with an input operation section through which an input is entered by an operator and a control section for performing prescribed control on the input operation section. The input operation section comprises: a comparison section for comparing prescribed data being input with prescribed data held by the input operation section; and a transmission section for transmitting the result of comparison made by the comparison section to the control section. The control section operates to transmit the received comparison result to another device. In an embodiment of the present invention, comparison data for the comparison and verification of membership identification numbers or the like is stored in advance in an interior memory of the input operation section, and when a user inputs a membership identification number through the touch panel for example, the input operation section makes a comparison and verification between the comparison data and the membership identification number input by the user so as to determine whether the user is registered as a member.

With this construction, the identity or personal information that is input to the apparatus by the user does not leak to the outside, thereby making it possible to ensure security. In addition, since a determination is made by the input operation section as to whether the input data is to be encrypted, it becomes unnecessary to perform the processing of encryption and decryption in the control section, thus reducing the encryption and decryption processing to be carried out inside the apparatus. As a result, the load of the apparatus is also reduced.

According to a fourth aspect of the present invention, there is provided an information processing apparatus equipped with an input operation section through which an input is entered by an operator and a control section for performing prescribed control on the input operation section. The input operation section comprises: a detection section for detecting an input operation by which prescribed data is input; an encryption section for encrypting prescribed data; and a transmission section for transmitting the result of detection by the detection section and the data encrypted by the encryption section to the control section. The control section controls the input operation section based on the detection result received and transmits the encrypted data received to a device having a decrypting function. For instance, in general, when a personal identification number is input in an apparatus such as a terminal in a banking facility, etc., the input number itself is not displayed on the screen, but instead only a symbol or sign (for instance, "•") indicative of the effect of the input is displayed every time each character is input. In this case, in the prior art, the input operation section encrypts the coordinate data pressed by the user and transmits them to the control section which then detects the input operation and controls the display screen. However, in an embodiment of the present invention, an input operation is detected by the input operation section, which then notifies only the input operation of the personal identification number to the control section, whereby the control section can control the display screen. In addition, when the input of all the numeric characters of the personal identification number has been completed, the entire personal identification number is encrypted and then transmitted to the control section, As a result, the time and trouble for encryption can be saved and security can also be improved as compared with the prior art.

BRIEF DESCRIPTION OF THE DRAWINGS

FIG. 5 is one example of a coordinate range for which security is required and its related data corresponding to this range.

FIG. 7(a) shows an example of displaying an input screen in the third and fourth embodiments.

FIGS. 7(b), 7(c) and 7(d) show examples of registered coordinate ranges and the patterns of information on their related data codes corresponding to the registered coordinate ranges in the second embodiment.

FIG. 10 is a block diagram illustrating a technique of encrypting and transmitting coordinate data pressed by a touch panel as it is.

DESCRIPTION OF THE PREFERRED EMBODIMENTS

Hereinafter, preferred embodiments of the present invention will be described in detail while referring to the accompanying drawings.

Embodiment 1.

Figure 1:
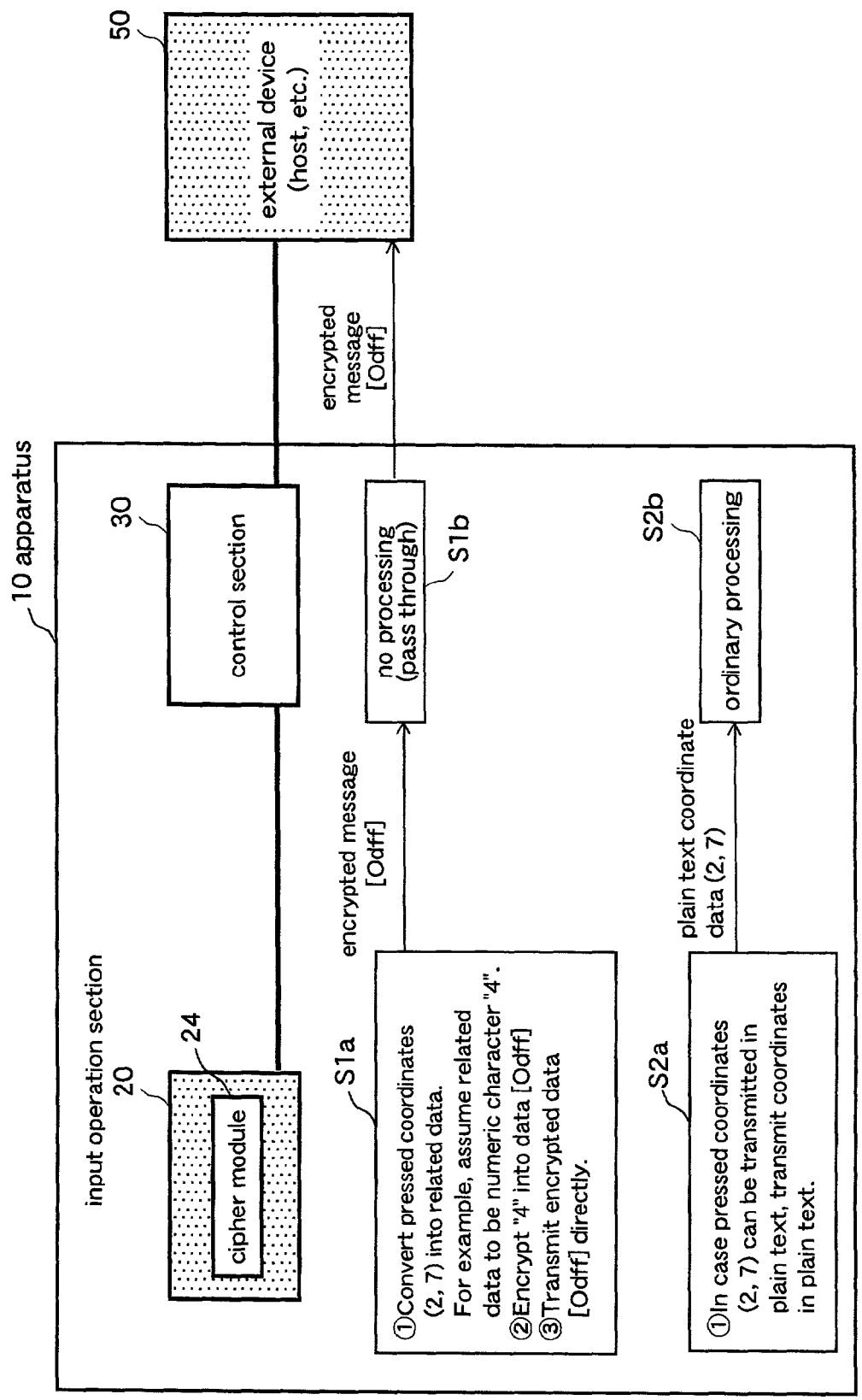
FIG. 1 is a block diagram schematically illustrating the basic construction of an information processing apparatus and a basic security ensuring technique according to a first embodiment of the present invention.

FIG. 1 is a block diagram schematically illustrating the basic construction of an information processing apparatus and a basic security ensuring technique according to a first embodiment of the present invention. The following description will be made using the same data as in FIG. 10 for comparison with the technique described with reference to FIG. 10. In this figure, an apparatus 10 includes an input operation section 20 and a control section 30 as in the case of the aforesaid apparatus 1 in FIG. 10, and the apparatus 10 is connected with an external device or equipment 50.

According to the security ensuring technique of the present invention, when coordinate data such as, for instance, (2, 7) are first input by means of a touch panel or the like in the input operation section 20, the input data or pressed coordinates (2, 7) are converted into related data. The related data referred to herein means a character such as a numeric character, a symbol and so on displayed on the coordinates pressed by the touch panel or the like. Here, assuming that the related data is a numeric character "4", the input operation section 20 determines whether the numeric character "4" is the data which should be encrypted. When the determination is positive, the numeric character "4" is encrypted into a corresponding encrypted message "0dff" by the cipher module 24 of the input operation section 20, and the encrypted message "0dff" is then transmitted to the control section 30 (step S1a). When the data received by the control section 30 is an encrypted message, no processing is done in the control section 30 and the received encrypted message "0dff" is transmitted to the external device 50 as it is (step S1b).

In addition, similarly, when coordinate data (2, 7) is input by the input operation section 20, it is determined whether the related data into which the pressed coordinate (2, 7) is converted need be encrypted. When it is determined that the data need not be encrypted (that is, data which can be communicated in so-called plain texts), the coordinate data (2, 7) is transmitted to the control section 30 in a plain text as it is (step S2a), where it is subjected to ordinary processing (step S2b).

Figure 9:
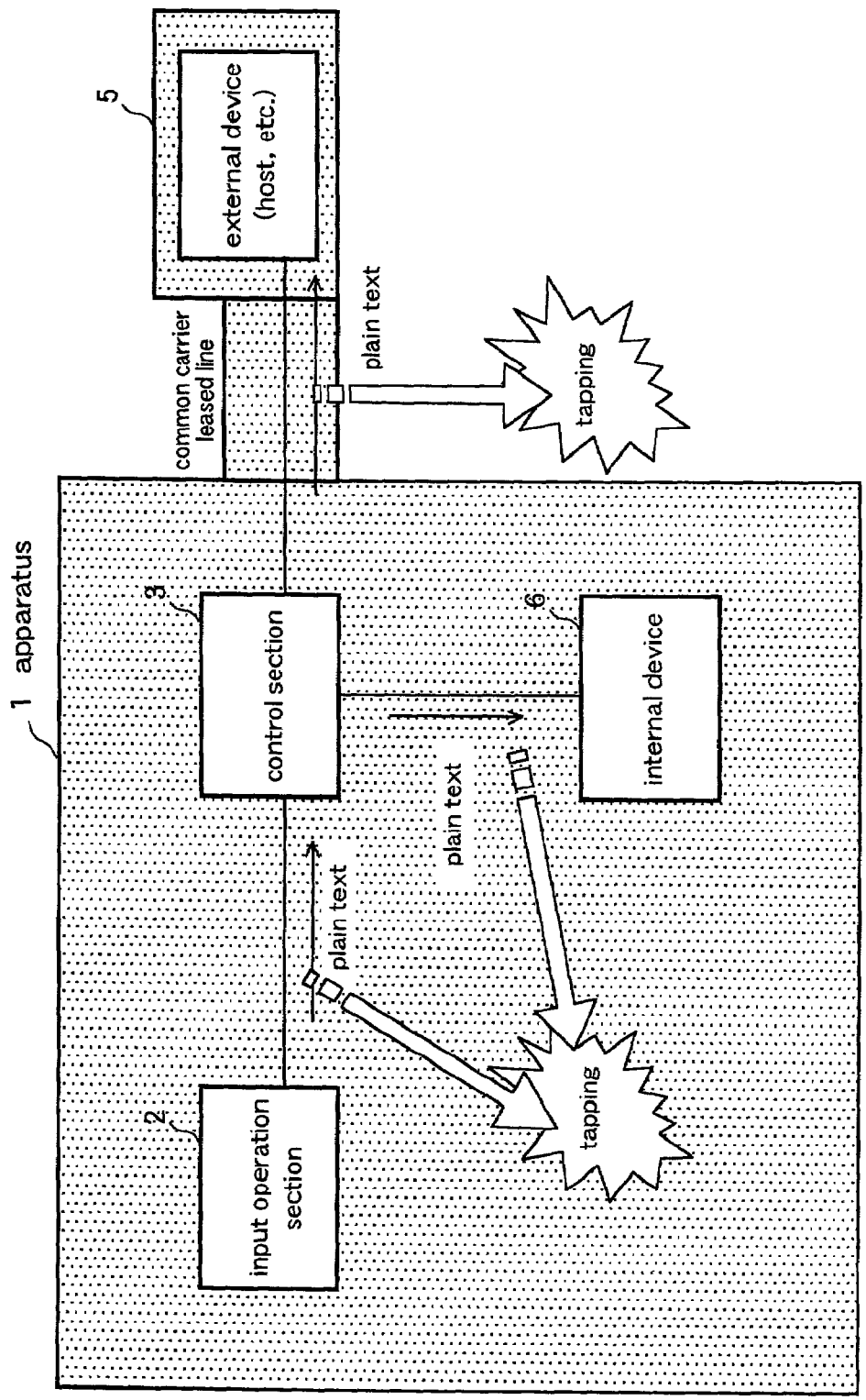
FIG. 9 is a block diagram illustrating a part for which security has been considered to be ensured.

Even in cases where it is impossible to integrate the entire apparatus or the input operation section 2 and the control section 3 with each other as an unauthorized or illegal conduct prevention device for ensuring security as in the apparatus 1 illustrated in FIG. 9, or even if the input operation section 2 is physically apart from the devices for which security is required, according to the above-described technique of the present invention, the control section 3 is only required to have a function of determining or discriminating the data needed to be encrypted from other data, but not to provide with the cipher module 4, as shown in this embodiment, whereby it is possible to ensure security in an easy and simple manner.

Embodiment 2.

Figure 2:
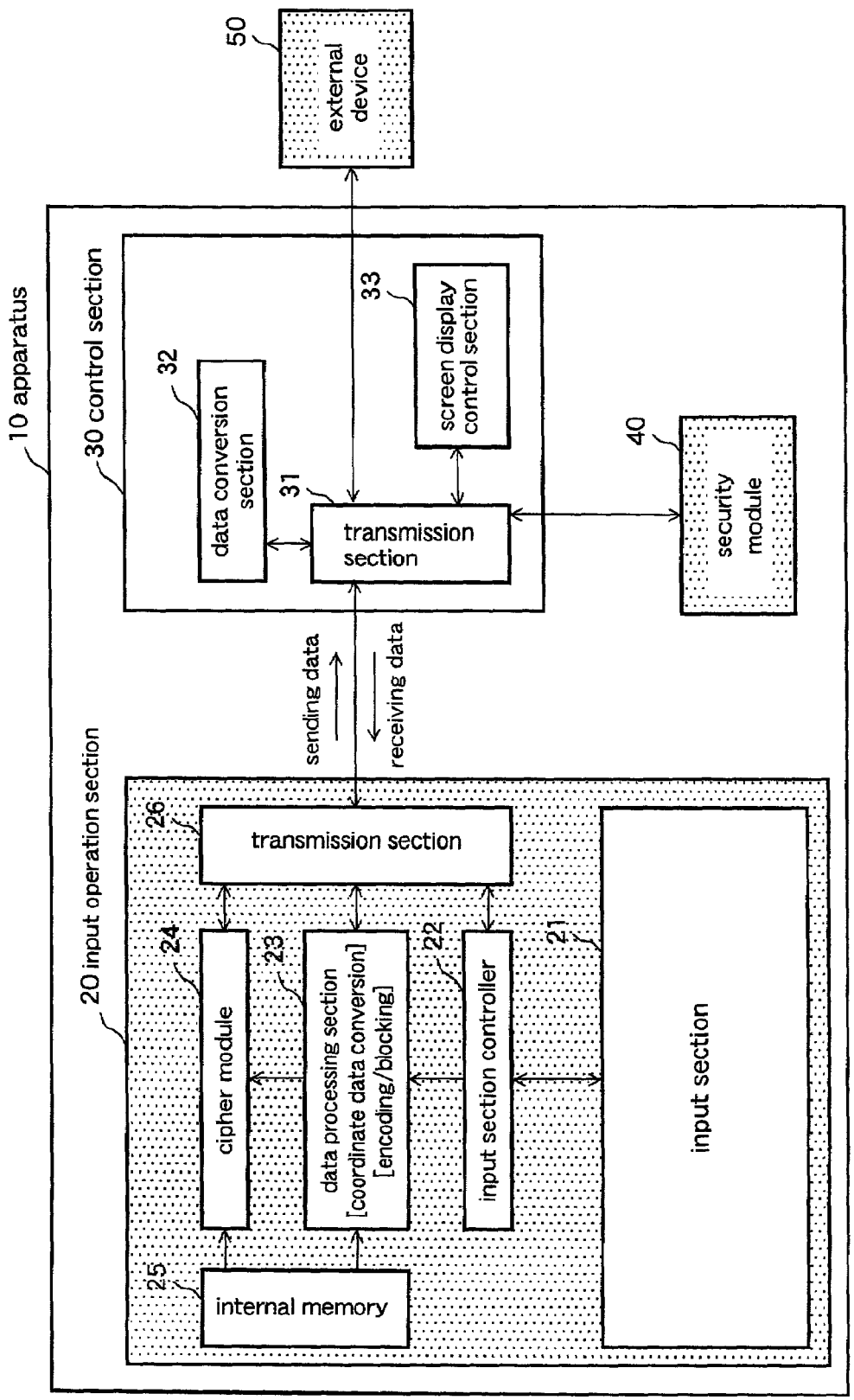
FIG. 2 is a block diagram illustrating the basic construction of information processing apparatuses according to second through fourth embodiments of the present invention.

FIG. 2 is a block diagram illustrating the basic construction of an information processing apparatus according to a second embodiment of the present invention. As illustrated in this figure, an apparatus 10 such as a banking terminal, one of a variety of kinds of ticket vending machines and so on, includes an input operation section 20 for controlling the input operation of a user and performing encryption and transmission of data, and a control section 30 for controlling the entire apparatus 10 and transmitting data to a device (e.g., security module) 40 such as an IC card or the external device 50 for which security is ensured.

The input operation section 20 includes an input section 21 such as a touch panel, an input section controller 22 for controlling the input operation of the input section 21, and a data processing section 23 which receives input data from the input section controller 22, converts coordinate data into prescribed data, and encodes or blocks the coordinate data for the purpose of encryption. The input operation section 20 includes a cipher module 24 for encrypting the data received from the data processing section 23, an internal memory 25 for preserving various kinds of data, and a transmission section 26 for sending and receiving data to and from the control section 30.

The control section 30 includes a transmission section 31 for sending and receiving data to and from the input operation section 20, the security module 40 and the external device 50, a data conversion section 32 for converting the coordinate data received by the transmission section 31 into prescribed data, and a display control section 33 for controlling a screen of the input section 21.

In addition, it is to be noted that a shaded part including the input operation section 20 and others in FIG. 2 is assumed to be a module (unauthorized conduct prevention device) for which security is ensured.

Figure 3:
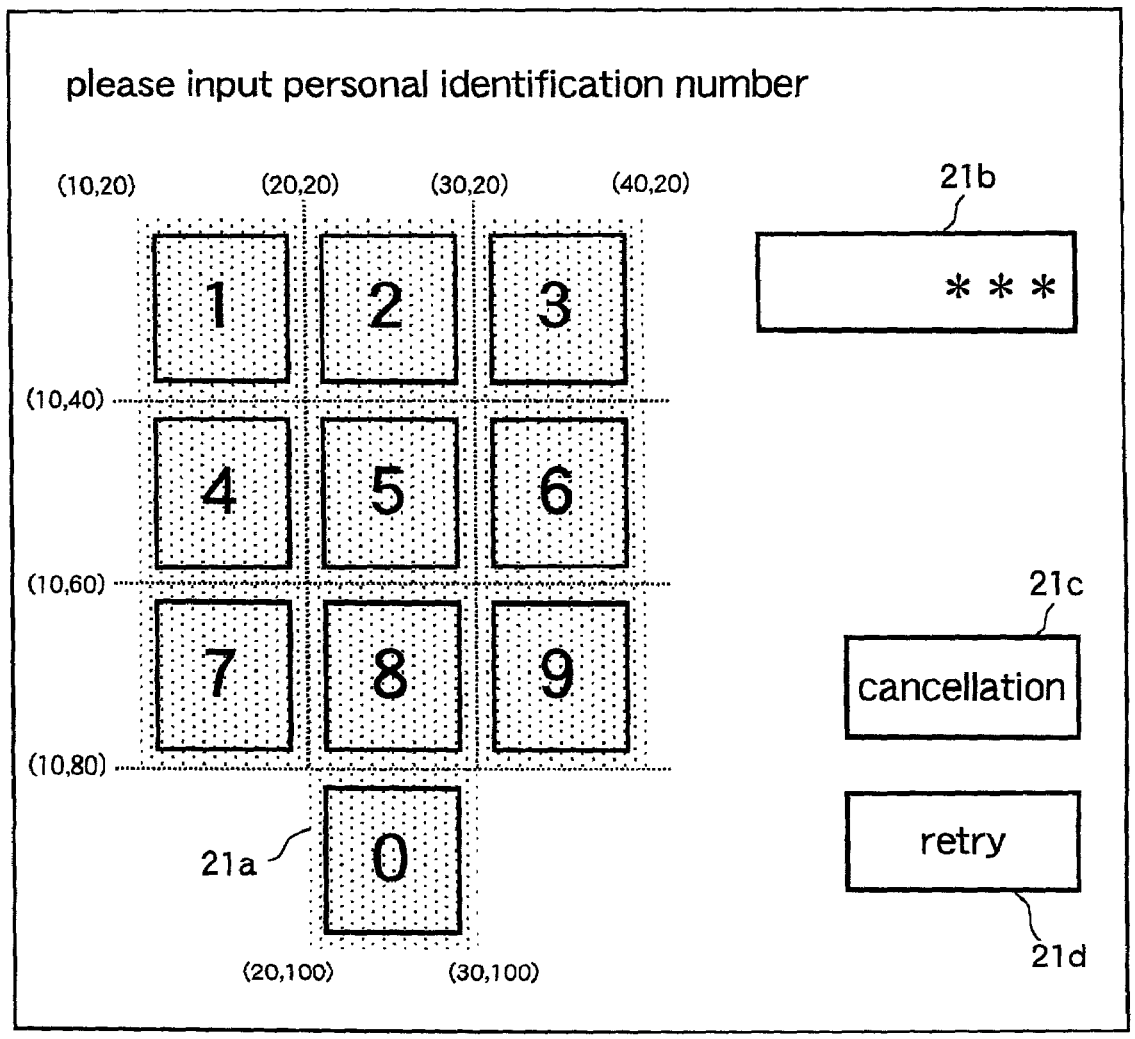
FIG. 3 shows an example of displaying a touch panel type input screen.

FIG. 3 is an example of displaying a touch panel type input screen controlled by the display control section 33. A shaded part in this figure represents a numeric character area 21a which is touched by a user who inputs a personal identification number, an amount of money, etc., and security is ensured for the data input in the numeric character area 21a. Moreover, the screen includes, in addition to the numeric character area or security area 21a, an area 21b in which a predetermined character such as "•" or the like is displayed upon an input operation of a user so that the user can confirm his or her input operation, an area 21c in which the user can cancel his or her input operation, and an area 21d in which the user can re-enter or retry his or her input operation.

Figure 4:
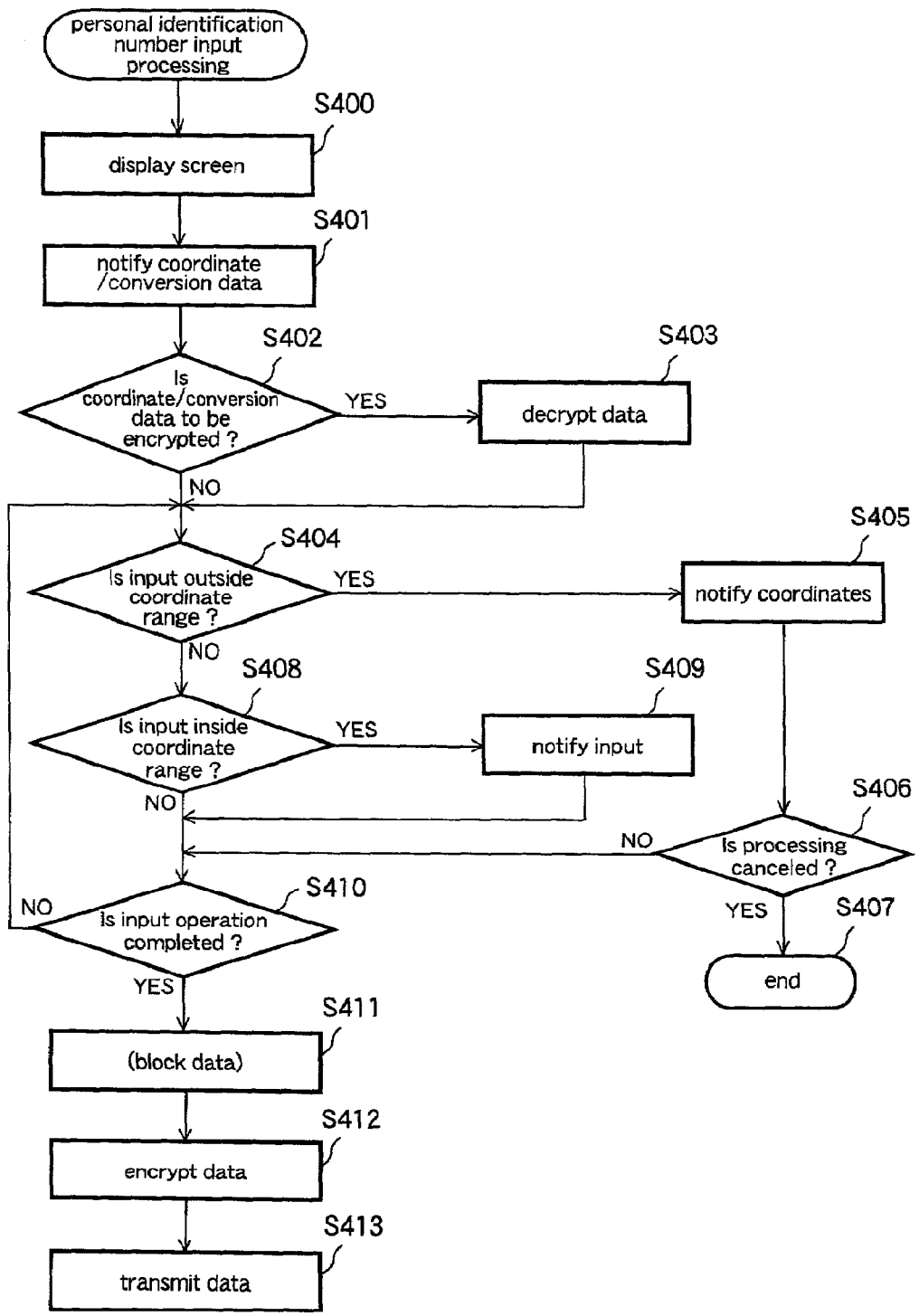
FIG. 4 is a flow chart illustrating the encryption processing in the second embodiment.

In the following, reference will be made to the details of the encryption processing based on the above-described configuration while using the flow chart of FIG. 4. In this embodiment, one example will be described in which a user carries out an input operation such that a personal identification number of four digits, which is a piece of personal secret information, is input to the apparatus 10, and the data thus input is not processed further or encrypted by encoding or blocking (grouping), and then transmitted to the external device 50 or the security module 40, which is an unauthorized or illegal conduct prevention device.

First of all, a screen as illustrated in FIG. 3 is displayed by the display control section 33 of the control section 30 in the apparatus 10 (step S400). In addition, information on the coordinate range (21a) where security is required on the screen of FIG. 3 is dynamically received and notified as data separately from the external device 50, and the designation of the coordinate range and its related data codes are set (step S401). The related data codes in this case are expediently assumed to be numeric characters, respectively. For instance, when a coordinate range (10–20, 20–40) in which "1" is displayed is pointed, this coordinate range is set as code "1", and similarly, when a coordinate range (20–30, 40–80) in which "5" is displayed is pointed, this coordinate range is set as code "5". Such settings are stored in the internal memory 25.

FIG. 5 illustrates one example of coordinate information as received. The received information may be an encrypted one, and in this case ("YES" in step S402), the encrypted information is decrypted for use by the cipher module 24 of the input operation section 20 (step S403). On the other hand, when not encrypted ("NO" in S402), the received information is used as it is. Though in this embodiment, information on coordinates requiring security is received from the external device 50 in this manner, such security requiring information may be statically stored in advance in the internal memory 25 of the input operation section 20.

Here, the user performs an operation of inputting a personal identification number on the screen as displayed in FIG. 3 through the input section 21. The data thus input by the user's input operation is notified to the input section controller 22, and converted into corresponding coordinate data. When, however, coordinates of the information not requiring security are pointed by such an input operation of the user ("YES" in S404), the coordinate information is ordinarily notified to and then processed by the control section 30. Concretely, if the user presses coordinates (60, 80) for instance, the input section controller 22 determines that the pressed coordinates (60, 80) is not within the coordinate range (numeric character area 21a) requiring security as illustrated in FIG. 3, and the coordinate information is notified to the control section 30 as it is (step S405). The data conversion section 32 in the control section 30 converts the coordinate data received by the transmission section 31 into related data, and if the related data of the pointed position is "cancellation" processing ("YES" in step S406), appropriate processing such as one for ending the input processing itself is performed (step S407). On the other hand, if the related data of the pointed position is "retry" or "re-enter" processing ("NO" in S406), processing such as one for deleting the data held in the internal memory 25 and urging the user to input or enter data from the beginning.

Moreover, when coordinates of the information for which security is required are pointed ("NO" in step S404, and "YES" in step S408), a code for informing the input operation alone is notified to the control section 30 instead of the coordinate information (step S409). The control section 30 having received the notification performs control in such a manner that a character or symbol such as "•" is displayed in the display area 21b of FIG. 3 on the screen so as to inform the user of the number of input digits while at the same time advising the user of the input through a sound or the like. Moreover, the data processing section 23 converts the pointed coordinates into a related data code by referring to the information in FIG. 5 stored in the internal memory 25, and stores the conversion result in the internal memory 25. For instance, if coordinates (15, 30) are input by the user, a related data code "1" is stored in the internal memory 25. The processings from step S404 to step S410 are repeated until the user's input of the personal identification number is finished ("NO" in step S410).

When coordinates of the information requiring security have been input at four points, it is assumed that the input of the personal identification number is finished ("YES" in step S410), and the data processing section 23 edits and blocks the code information in the internal memory 25 (step S411), which is then encrypted by the cipher module 24 (step S412) and sent from the transmission section 26 to the control section 30 (step S413). Incidentally, note that the blocking may be carried out such that codes are applied to higher-ranking digits in the order of entry with a code not input being made as "0", thus performing the blocking of 8 digits for instance. In this case, the data pointed in the order of codes "1", "2", "3" and "4" for instance becomes "12340000".

Of course, it is not necessarily perform such blocking, but instead encoding or only encrypting without any processing may be carried out, and hence such processing is not limited in any manner.

The encryption is performed by using a key stored in the internal memory 25. The encrypted data transmitted is sent to the secure external device 50 or the security module 40 through the control section 30. In this case, the encrypted data is not analyzed by the control section 30.

Embodiment 3.

The basic construction of an information processing apparatus according to a third embodiment is similar to that of the second embodiment as illustrated in FIG. 2. In this embodiment, an example is used in which membership identification number input processing of 8 digits is performed, and a membership identification number input is compared and confirmed in the input operation section 20 so as to verify whether the number is registered as a member. Accordingly, in this embodiment, it is assumed that comparison data for comparing and confirming the membership identification number input by the user is stored in advance in the internal memory 25 or encrypted comparison data is dynamically received from the external device 50. In addition, in this embodiment, a plurality of patterns each including a coordinate range/position and their related data are stored in advance in the internal memory 25, so that the administrator of the apparatus 10 can arbitrarily select one of these patterns in accordance with the display screen.

Figure 6:
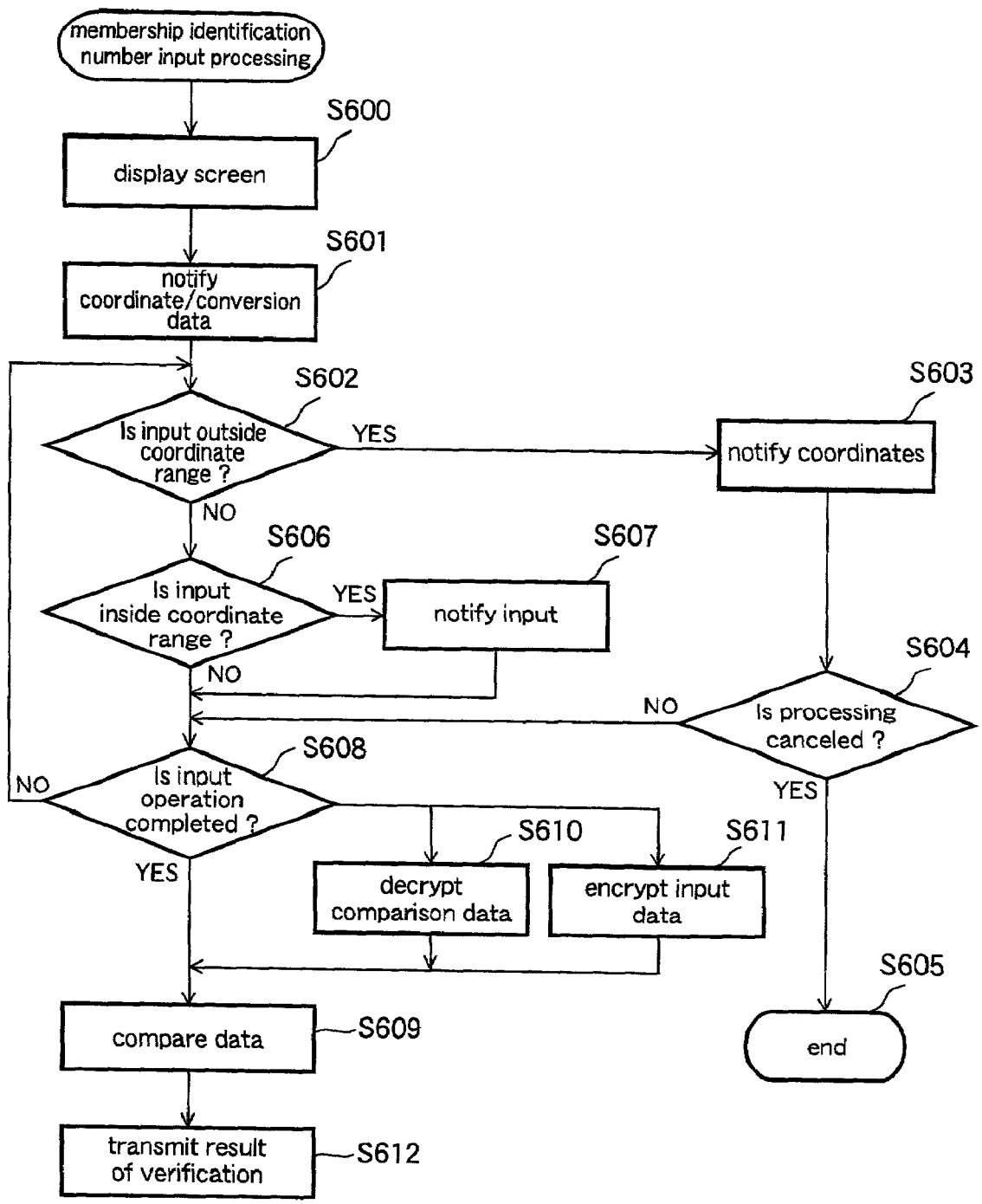
FIG. 6 is a flow chart illustrating the membership identification number input processing in the third embodiment.

FIG. 6 is a flow chart illustrating details of the membership identification number input processing in this third embodiment. First of all, a screen for inputting a membership identification number is displayed by the display control section 33 of the control section 30 in the apparatus 10 (step S600). FIG. 7(a) is an example of displaying such a screen for inputting a membership identification number in this embodiment. Also, a plurality of patterns of information on coordinate ranges and related data codes corresponding thereto as illustrated in FIG. 5 are registered in advance in the internal memory 25. FIGS. 7(b), 7(c) and 7(d) are examples of the registered patterns, and in this case, three patterns are registered. In these figures, shaded parts are the input areas requiring security.

Then, the administrator of the apparatus 10 selects from the registered patterns (FIGS. 7(b), 7(c) and 7(d)) an optimal pattern which matches the coordinate range information requiring security on the screen of FIG. 7(a), and sets the designation of a coordinate range and its related data codes. In this case, a pattern 1 in FIG. 7(b) is selected for example (step S601). As for the screen for the pattern selection, a setting input screen (not shown) for the administrator is separately prepared by the display control section 33, so that the administrator can perform the pattern selection on the setting input screen. In addition, the setting of designation of the coordinate range and the related data codes according to the selected pattern are performed in the same manner as in the case of the second embodiment. Based on the setting, it is determined whether the input coordinate data requires security, and processing is carried out based on this determination.

Concretely, the user first performs an operation of inputting a membership identification number from the input screen of FIG. 7(a) by means of the input section 21. The data thus input by the user's input operation is notified to the input section controller 22, and converted into corresponding coordinate data. The input section controller 22 determines based on the above setting whether the converted coordinate data requires security, and when coordinates of the information not requiring security are pointed ("YES" in step S602), the coordinate information is ordinarily notified to the control section 30 as it is (step S603) and processing is accordingly performed. The processings from step S604 to step S605 are the same as those of the aforementioned second embodiment, and hence a description thereof is omitted.

Moreover, processing in step S607, which is performed when coordinates of the information requiring security are pointed ("NO" in step S602 and "YES" in step S606), is also the same as that in the second embodiment, and related data codes corresponding to the pointed coordinates are stored in the internal memory 25. The processings from step S602 to step S608 are repeated until the user's input of the membership identification number is finished ("NO" in step S608).

When coordinates of the information requiring security are input at eight points (for instance, it is expediently assumed here that a membership identification number "DF8-5220" is input), the data processing section 23 determines that the input of the membership identification number has been finished, and compares, in step S609, the input data with a comparison data in the internal memory 25 when such comparison data statically exists in the memory 25 ("YES", statically in step S608). On the other hand, when encrypted comparison data dynamically received is used ("YES", dynamically in step S608), a comparison is made using a method of decrypting the received encrypted data (step S610) for comparison or a method of encrypting the input data for comparison (step S611). In the method of encrypting the input data, the same key as that by which the received comparison data is encrypted is stored in advance in the internal memory 25, so that encryption of the input data is carried out by using the same key. Any comparison method may be used, and there is no particular limitation in this respect.

Hereinafter, an example of such comparison processing will be described.

Case 1: USING COMPARISON DATA STATICALLY STORED IN INTERNAL MEMORY (Step S609)

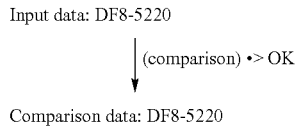

Input data: DF8-5220

| (comparison) •> OK

Comparison data: DF8-5220

Case 2: USING COMPARISON DATA DYNAMICALLY RECEIVED AND DECRYPTED (Step S610)

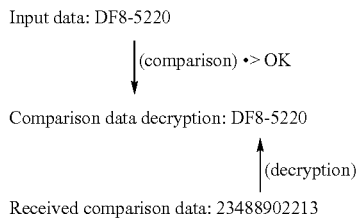

Input data: DF8-5220

| (comparison) •> OK

Comparison data decryption: DF8-5220

| (decryption)

Received comparison data: 23488902213

Case 3: USING COMPARISON DATA DYNAMICALLY RECEIVED, BUT ENCRYPTING INPUT DATA FOR COMPARISON (Step S611)

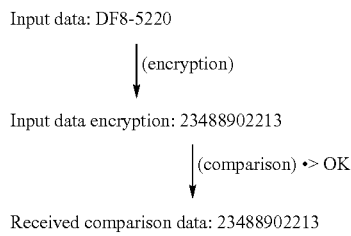

Input data: DF8-5220

| (encryption)

Input data encryption: 23488902213

| (comparison) •> OK

Received comparison data: 23488902213

The results of these comparisons and verifications carried out in this manner are notified to the control section 30 or to the external device 50 and the security module 40 through the control section 30 (step S612). Concretely, if coincidence is confirmed or verified (above-mentioned OK), a verification success code is transmitted as transmission data from the transmission section 26. If not (there exists a difference), a verification failure code is transmitted as transmission data from the transmission section 26. Thus, in this embodiment, the input data is processed in the input operation section 20, and only the verification result is notified to the outside.

Embodiment 4.

The basic construction of an information processing apparatus according to a fourth embodiment of the present invention is similar to that of the second embodiment as illustrated in FIG. 2. In addition, it is assumed that an example of screen display is the same as that of FIG. 7(a). In this embodiment, an example is used in which the administrator of the apparatus 10 performs the processing of inputting an encryption/decryption key of 16 digits, and the data encrypted by the use of an input encryption key is transmitted.

Figure 8:
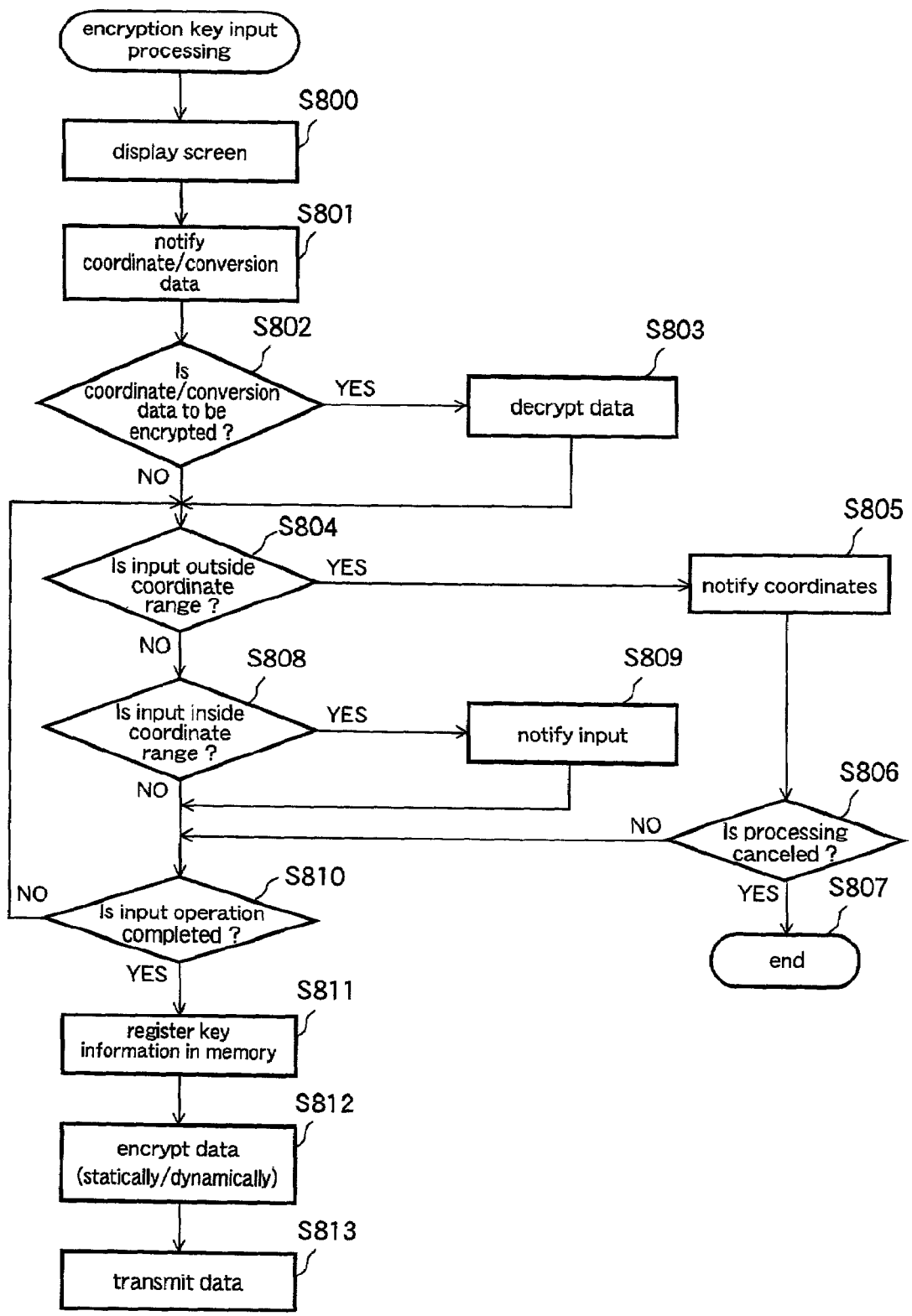
FIG. 8 is a flow chart illustrating the details of encryption key input processing in the fourth embodiment.

FIG. 8 is a flow chart illustrating the details of the encryption key input processing in this embodiment. First of all, a screen for inputting an encryption key is displayed by the display control section 33 of the control section 30 in the apparatus 10 (step S800). Also, similar to the second embodiment, information on the designation of a coordinate range and its related data codes is dynamically received separately from the external device 50 (from step S801 to step S803).

In addition, similar to the second embodiment, the administrator first carries out an operation of inputting an encryption key from the input screen of FIG. 7(a) through the input section 21. The flow of processing from the start of the input operation to the end thereof (from step S804 to step S810) is the same as that in the second embodiment.

When coordinates of the information requiring security are input at sixteen points (for instance, it is expediently assumed here that an encryption/decryption key "0123456789ABCDEF" is input), they are stored in the internal memory 25 by means of the input section controller 22 (step S811). By using the encryption/decryption key thus stored, the cipher module 24 encrypts the data stored in the internal memory 25 or the data dynamically received from the external device 50 (step S812). An example of such encryption is described below.

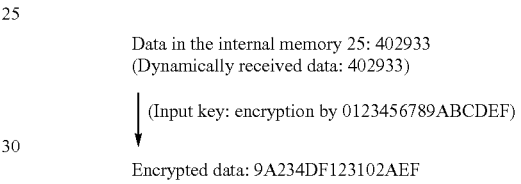

Data in the internal memory 25: 402933
(Dynamically received data: 402933)

| (Input key: encryption by 0123456789ABCDEF)

Encrypted data: 9A234DF123102AEF

The encrypted data sent to the control section 30 is further transmitted from the control section 30 to the secure external device 50 or the security module 40 (step S813).

Here, note that the encryption method itself is not within the object of the present invention, and hence a detailed description thereof is omitted.

In addition, the encryption/decryption key, which is input and stored in this embodiment, can also be used in all the preceding embodiments.

As described in the foregoing, according to the present invention, there is provided an apparatus including an input operation section, a control section, a cipher module for encrypting the data input to the input operation section, and a transmission section for transmitting the data to an external device. With this construction, even in cases where it is impossible to integrate the input operation section and the control section with each other as an unauthorized or illegal conduct prevention device, or even if the input operation section 2 is physically apart from the devices for which security is required, leakage of the identity or personal information can be prevented, thus making it possible to protect security. In addition, the present invention provides a function of determining whether the data input to the input operation section should be encrypted, so that it becomes unnecessary for the control section to perform the processing of encrypting and decrypting the data received from the input operation section. As a result, the processing of encryption and decryption to be carried out in the apparatus can be alleviated, thus reducing the load of the apparatus. Moreover, even in the case of a conventional apparatus being used, it is unnecessary to make a change on the side of a control section of the apparatus but it is possible to cope with such a situation by replacement of an input operation section alone. Thus, it is possible to reduce the cost of introducing the apparatus of the present invention into an existing one while improving security therein to a substantial extent.

Although the various embodiments of the present invention have been described above, the present invention is not limited to the embodiments specifically referred to above, but may of course be changed or modified without departing from the scope or spirit of the present invention as defined in the appended claims.

What is claimed is:

1. An information processing apparatus including an input operation section through which an input is entered by an operator and a control section for performing prescribed control on said input operation section, said input operation section comprising: an encryption determining section for discriminating data to be encrypted from data input through said input operation section; an encryption section for encrypting the data to be encrypted based on the result of determination of said encryption determining section; and a transmission section for transmitting both the encrypted data and non-encrypted data; wherein said control section performs processing based on the content of non-encrypted data received from said input operation section and at the same time sends encrypted data received from said input operation section to a device having a decryption function.

2. The information processing apparatus according to claim 1, wherein said input operation section has an input operation screen, and said encryption determining section determines whether the input data is to be encrypted, depending upon whether coordinates pressed on the input operation screen exist in a predetermined range or position.

3. The information processing apparatus according to claim 2, wherein said encryption section converts data, which is input in at least one of said predetermined coordinate range and said predetermined coordinate position on said input operation screen, into data information related to said coordinate range or position, and encrypts the data thus converted by using a predetermined key.

4. The information processing apparatus according to claim 2, further comprising a setting section for dynamically receiving and setting information on a predetermined coordinate range or position on said input operation screen from an external device, wherein said encryption determining section determines whether the input data is to be encrypted, depending upon whether coordinates pressed on the input operation screen exist in the predetermined range or position set by said setting section.

5. The information processing apparatus according to claim 1, wherein a key for encrypting said data and a key for decrypting said encrypted data as necessary are formed based on prescribed data which is input through said input operation section.

6. The information processing apparatus according to claim 1, wherein said input operation section comprises an unauthorized conduct prevention device.

7. The information processing apparatus according to claim 1, wherein said prescribed data is data for which security is required, and includes at least one of personal secret information of an operator such as a personal identification number, a credit card identification number, etc., and an encryption/decryption key.

8. An input operation apparatus having an input operation screen for providing information, which is input by an operator through said input operation screen, to an information processing apparatus connected therewith, said input operation apparatus comprising: a setting section for setting data setting information for converting information on a predetermined coordinate range or position on said input operation screen as well as data, which is input in said predetermined coordinate range or position, into data information related to said coordinate range or position; an encryption determining section for determining whether the input data is to be encrypted, depending upon whether coordinates pressed on said input operation screen exist in said predetermined coordinate range or position set by said setting section; an encryption section for converting the input data, which is determined to be encrypted by said encryption determining section, into data information related to said coordinate range or position based on the data setting information set by said setting section, and encrypting the data thus converted by using a predetermined key; and a transmission section for transmitting both the encrypted data and non-encrypted data to said information processing apparatus connected therewith.

9. The information processing apparatus according to claim 3, wherein said encryption section converts data, which is input in at least one of said predetermined coordinate range and said predetermined coordinate position on said input operation screen, into data information related to said coordinate range or position, encodes or blocks said data information, and encrypts said data thus encoded or blocked by using a predetermined key.

10. The information processing apparatus according to claim 3, further comprising a setting section for dynamically receiving and setting data setting information from said external device for converting data, which is input in at least one of said predetermined coordinate range and said predetermined coordinate position on said input operation screen, into data information related to said coordinate range or position, wherein said encryption section converts data, which is input in at least one of said predetermined coordinate range and said predetermined coordinate position on said input operation screen, into data information related to said coordinate range or position based on the data setting information set by said setting section, and encrypts the data thus converted by using a predetermined key.

11. The information processing apparatus according to claim 10, wherein said data setting information received from said external device is encrypted, and said input operation section includes a decryption section for decrypting said encrypted data setting information.

12. The information processing apparatus according to claim 10, further comprising: a storage section for storing a plurality of mutually different pieces of data setting information; and a setting section for selecting and setting prescribed pieces of data setting information among said plurality of pieces of data setting information on said input operation screen.

13. An information processing apparatus equipped with an input operation section through which an input is entered by an operator and a control section for performing prescribed control on said input operation section, wherein said input operation section comprises: a comparison section for comparing prescribed data being input with prescribed data held by said input operation section; and a transmission section for transmitting the result of comparison made by said comparison section to said control section; wherein said control section operates to transmit the received comparison result to another device.

14. The information processing apparatus according to claim 13, wherein said input operation section includes a comparison discrimination section for discriminating data to be compared by said comparison section among the data input by said input operation section, and said comparison section performs a comparison of the data discriminated by said comparison discrimination section.

15. The information processing apparatus according to claim 14, wherein said input operation section has an input operation screen, and the data, which is discriminated by said comparison discrimination section and subjected to the comparison processing by said comparison section, is input in at least one of a predetermined coordinate range and a predetermined coordinate position on said input operation screen, and is related to said coordinate range or position.

16. The information processing apparatus according to claim 13, wherein the prescribed data held by said input operation section is stored in a memory in said input operation section.

17. The information processing apparatus according to claim 13, wherein said prescribed data held by said input operation section is data based on the received data which is sent from an external device while being subjected to encryption.

18. The information processing apparatus according to claim 17, wherein said information processing apparatus comprises a decryption section for decrypting said encrypted data.

19. The information processing apparatus according to claim 18, wherein said input operation section includes an encryption section for encrypting the data input from said input operation section by a common key by means of which said received data sent from said external device has been encrypted, and said comparison section makes a comparison between these encrypted data.

20. The information processing apparatus according to claim 17, wherein said input operation section includes an encryption section for encrypting the data input from said input operation section by a common key by means of which said received data sent from said external device has been encrypted, and said comparison section makes a comparison between these encrypted data.

21. An information processing apparatus equipped with an input operation section through which an input is entered by an operator and a control section for performing prescribed control on the input operation section, wherein said input operation section comprises: a detection section for detecting an input operation by which prescribed data is input; an encryption section for encrypting prescribed data; and a transmission section for transmitting the result of detection by said detection section and the data encrypted by said encryption section to said control section; wherein said control section controls said input operation section based on the detection result received and transmits the encrypted data received to a device having a decrypting function.

* * * * *